(12) United States Patent
Meyer De Groot et al.

(10) Patent No.: US 6,414,042 B1
(45) Date of Patent: Jul. 2, 2002

(54) PRODUCTION OF POROUS DIENE POLYMER PELLETS BY MECHANICAL DRYING

(75) Inventors: Eleanor Meyer De Groot, Friendswood; Bing Yang, Houston, both of TX (US)

(73) Assignee: Kraton Polymers US LLC, Houston, TX (US)

( * ) Notice: Subject to any disclaimer, the term of this patent is extended or adjusted under 35 U.S.C. 154(b) by 0 days.

(21) Appl. No.: 09/959,241

(22) PCT Filed: Apr. 19, 2000

(86) PCT No.: PCT/EP00/03731

§ 371 (c)(1),
(2), (4) Date: Oct. 18, 2001

(87) PCT Pub. No.: WO00/64949

PCT Pub. Date: Nov. 2, 2000

Related U.S. Application Data

(60) Provisional application No. 60/130,351, filed on Apr. 21, 1999.

(51) Int. Cl.$^7$ .............................. C08J 9/12; C08J 9/18
(52) U.S. Cl. .............................. 521/60; 82/139; 82/140
(58) Field of Search .......................... 521/142, 82, 139, 521/60

(56) References Cited

FOREIGN PATENT DOCUMENTS

| JP | 01-182308 | 7/1989 | ......... C08F/212/06 |
| JP | 02-187403 | 7/1990 | ............. C08F/6/10 |

*Primary Examiner*—Morton Foelak

(57) ABSTRACT

A process for finishing a hydrogenated diene polymer by producing porous pellets from a water slurry of the hydrogenated block copolymer. The process comprises adjusting the water content of the slurry to from 9 to 16 percent by weight, moving the slurry through a mechanical two-stage extruder dryer, drying the slurry at a temperature of 100 to 180° C., and recovering porous copolymer pellets having a moisture content of 0.2 to 3.0 percent by weight.

3 Claims, No Drawings

PRODUCTION OF POROUS DIENE POLYMER PELLETS BY MECHANICAL DRYING

This application claims priority from provisional application Ser. No. 60/130,351, filed Apr. 21, 1999.

FIELD OF THE INVENTION

This invention relates to finishing hydrogenated diene polymers into a final product form that is easily handleable. More particularly, the invention relates to a mechanical drying process for producing porous pellets of block copolymers of vinyl aromatic hydrocarbons and conjugated dienes.

BACKGROUND OF THE INVENTION

Block copolymers of vinyl aromatic hydrocarbons, such as styrene, and conjugated dienes, such as butadiene or isoprene, have been made commercially for many years and are known to be highly advantageous in a number of applications. Unhydrogenated versions of such polymers are generally sold in pellet form because of its easier handleability. However, high molecular weight hydrogenated block copolymers of styrene and butadiene (SEBS) or styrene and isoprene (SEPS) block copolymers are typically made in crumb form. Crumb is preferred over pellets because it is easier to compound with other ingredients during customer processing than pellets are in the case of these high molecular weight hydrogenated block copolymers and also for hydrogenated star polyisoprene polymers. The higher specific surface area of crumb enables faster oil absorption rate and easy dispersion of the polymer in a compound, compounds being one of the major applications for such hydrogenated polymers.

However, crumb is difficult to handle. The low bulk density of crumb causes difficulty when it is blended with higher density dense pellets, such as polypropylene, because the two materials tend to segregate while they are being fed into the blending apparatus. In addition, crumb tends to agglomerate during shipping and storage, thereby necessitating grinding before use. Finally, crumb cannot be handled by pneumatic conveying and automatic weighing systems used by many users of this material.

It has long been a desire to produce such hydrogenated polymers in a pellet form which is more dense than the crumb but which can be easily compounded. These polymers are not very amenable to pellet formation. Because of their high molecular weight, they are subject to severe degradation under high shear rates encountered in extrusion processes. Furthermore, the specific surface area required to enhance easy compounding can be destroyed during such processes. The low porosity pellets which have been able to be produced thus far result in undispersed gels during compounding of the hydrogenated block copolymers.

Mechanical dryers are screw extruders specially designed for drying rubber crumbs made during hot water coagulation finishing processes. This technology has been widely used by manufacturers of synthetic rubbers. The main objective of the process is to remove free water from the crumb and provide final drying of the rubber through mechanical shear heating. Although this technology has been used extensively in finishing unhydrogenated block copolymers, it is not widely used in finishing hydrogenated block copolymers, especially high molecular weight hydrogenated block copolymers, because of their high viscosity. The present invention provides a process whereby hydrogenated polymers having high viscosity can be finished into porous pellets using a mechanical dryer process. Lower viscosity polymers may also be converted into porous pellets by this process.

SUMMARY OF THE INVENTION

This invention is a process for finishing hydrogenated polymers of conjugated dienes and, optionally, vinyl aromatic hydrocarbons (block copolymers). Porous pellets are produced from a water slurry of the hydrogenated polymer by first adjusting the water content of the slurry to from 9 to 16 percent by weight, moving the slurry through a mechanical extruder dryer, drying the slurry at a temperature of 100 to 180° C., and recovering porous copolymer pellets having a moisture content of 0.2 to 3.0 percent by weight. It is preferred that the initial water content of the slurry be adjusted to from 13 to 15 percent by weight. The slurry can be the product of hot water coagulation or the product produced by dry cyclone finishing can be used to create the required water slurry. Either system produces porous pellets which can be handled using pneumatic conveying facilities and which are easily oilable and are capable of producing oil/polypropylene/block copolymer contents with low gel content.

DETAILED DESCRIPTION OF THE INVENTION

The polymers of this invention are generally produced by contacting the conjugated diene monomer or monomers and optionally, vinyl aromatic hydrocarbon monomer, to be polymerized simultaneously or sequentially with an anionic polymerization initiator such as Group IA metals or derivatives thereof. It is preferred to use an organo alkali metal compound in a suitable solvent at a temperature within the range of from −150° C. to 300° C.

Particularly effective anionic polymerization initiators or organo lithium compounds having the general formula RLin wherein R is an aliphatic, cycloaliphatic, aromatic, or alkyl-substituted aromatic hydrocarbon radical having from 1 to 20 carbon atoms and n is an integer of 1 to 4.

Conjugated dienes which may be polymerized anionically include those containing from 4 to 12 carbon atoms such as 1,3-butadiene, isoprene, and the like. Vinyl aromatic hydrocarbons which may be copolymerized include vinyl aryl compounds such as styrene, alpha methyl styrene, and the like.

The anionic polymerization is carried out in a suitable solvent and such are well known in the art. Suitable solvents include hydrocarbons such as hexane, cycloaliphatic hydrocarbons such as cyclohexane, and aromatic hydrocarbons such as benzene or toluene. The polymers are hydrogenated using Group VIII metal/aluminum trialkyl catalysts as described in U.S. Reissue Pat. No. 27,145 or by the use of titanium catalysts as described in U.S. Pat. No. 5,039,755, both of which patents are herein incorporated by reference to illustrate the hydrogenation part of the process and also the initial anionic polymerization of the polymers.

Following hydrogenation, the product produced is a slurry of the polymer in the organic solvent. The catalyst residue is washed out of the polymer using a water wash. The polymer is finished, i.e., the organic solvent is removed, by one of several known finishing processes. One of these processes is hot water coagulation. Another is cyclone finishing. These and other finishing processes are well known in the art. As described above, the high molecular weight hydrogenated polymers of the present invention are at this point usually produced in crumb form with its inherent advantages and disadvantages.

A water slurry of the hydrogenated polymer having a water content of from 9 to 16 percent by weight must be formed. This can be done by partially drying a higher water content slurry from hot water coagulation or by creating a water slurry from the dry product of cyclone finishing. If the water content of the slurry entering the mechanical dryer is less than 9 percent by weight, then the fines content of the product produced is unacceptably high and the temperature inside the mechanical dryer will be unstable. If feed moisture content is above 16 percent, then the final moisture content of the pellets produced is above 3 percent and thus the resultant pellets are too dense. It is preferred that the feed water slurry content by from 13 to 15 percent by weight because this water content is best to cause expansion of the pellets and give the desired porosity and pellet integrity.

The water slurry is then moved through the mechanical one stage (it is also possible to use a two-stage dryer) extruder dryer at a rate of 227 to 4,536 kg/hr (500 to 10,000 lbs/hr). The mechanical dryer(s) convert mechanical energy into heat to dry the polymer slurry. The design of these dryer(s) resembles a screw extruder. If two machines are used, they are used in tandem. The first one mainly removes free water by its squeezing action. The second one generates more heat and facilitates the final drying step. The optimal throughput rate will depend on the size of the extruder, the type of polymer molecule, and the amount of water entrained in the crumb. If the rate is too low, the pellet size and shape will not be acceptable and excessive fines may form. If the rate is too high, the pellets contain excessive water and are too dense to absorb oil quickly. The temperature inside the mechanical dryer should range from 100 to 180° C. to improve the flashing of the residual water and to produce the desired porosity. Generally, it is preferred to use lower die pressures to avoid excessive compacting of the product.

The polymer exiting the mechanical dryer is cut into pellets. These pellets have a porosity (in terms of total pore size) of at least 0.4 cc/g and a moisture content in the range of 0.2 to 3.0 percent by weight. Other properties of the pellets include fast oil absorption, low bulk density, and low gel content. This is important so that the polymer can be handled using current commercially available pneumatic conveying equipment.

In another embodiment of the present invention, an inert gas is injected into the mechanical dryer to enhance volatiles removal and porosity control. Nitrogen is the preferred gas for injection. The injection of the gas is particularly effective for lowering the bulk density of the final polymer pellet.

EXAMPLES

The mechanical dryer apparatus used herein was a 7 inch diameter extruder with a length to diameter ratio of 4.5 and which contained 5.5 extruder sections. The die temperature varied from 154 to 177° C. (310 to 350° F.) with the nominal temperature being about 163° C. (325° F.). The shaft speed varied from 70 to 85 rpm. Two different die designs were used. Design No. 1 had 150 holes each at 3.2 mm (⅛ inch) diameter and 4.8 mm (3/16 inch) land length. Die design No. 2 had 680 holes, 3.2 mm (⅛ inch) diameter, and 6.4 mm (¼ inch) land length.

The following table shows the conditions of drying and the results. Sample No. 1 was the control. This was polymer which was taken before the dryer. In all samples, the polymer was a hydrogenated styrene-butadiene-styrene block copolymer having a number average molecular weight of 280,000.

The oil absorption and gel rating were determined by taking 100 parts by weight of polymer and tumbling them with 200 parts by weight oil and 53 parts by weight polypropylene for 15 minutes and then allowing this blend to sit for an additional 25 minutes. The mixture was compounded using a twin screw extruder. The resultant compound was later extruded into a 25.4 mm (1 inch) strip using a 19 mm (¾ inch) extruder. The strips were examined for gels and given a rating (higher numbers are worse).

The far right column of the table shows the percentage of pores, based on pore volume, with a diameter from 0.1 to 4.0 microns. If the polymer has more micropores, the oil will diffuse easier into the polymer and there will be more uniform distribution of the oil. It can be seen that Sample No. 4 has a dramatically higher total pore area and percentage of pores with diameter from 0.1 to 4.0 microns and also the lowest gel rating.

TABLE

| Sample | Die No. | Mechanical Dryer Size mm (inch) | Feed Moisture (%) | Moisture @ exit of Dryer | Gel Rating | Nitrogen Injection | Throughput Rate kg/hr (lbs/hr) |
| --- | --- | --- | --- | --- | --- | --- | --- |
| 1 (Control) | N/A | N/A | N/A | N/A | 6 to 12 | N/A | N/A |
| 2 | 1 | 178 (7) | 7.9 | 0.31 | 3 to 4.5 | no | 469 (1035) |
| 3 | 1 | 178 (7) | 9.4 | 1.2 | 3 | no | 484 (1068) |
| 4 | 2 | 178 (7) | 13 | 0.75 | 2 to 3 | yes (51 scf/h) | 467 (1030) |
| 5 | 2 | 178 (7) | 13 | 0.5 | >3 | no | 469 (1034) |
| 6 | 2 | 178 (7) | 15.5 | 0.49 | 6 | no | 532 (1172) |
| 7 | 2 | 178 (7) | 15.3 | 1.2 | 3 | yes (64 scf/h) | 541 (1193) |

TABLE-continued

| Sample | Die Pressure MPa (psig) | Bulk Density kg/hr (lbs/ft$^3$) | Oil Absorption Rate (fast/slow) | Total Pore Size (cc/gm) | Total Pore Area (m$^2$/gm) | Total Pore Size/Total Pore Area (cc/m$^2$) | % Pores With Diameter from 0.1 to 4.0 Microns (Based on Pore Vol.) |
|---|---|---|---|---|---|---|---|
| 1 (Control) | N/A | 0.29 to 0.32 (18 to 20) | slow | 0.890 | 0.485 | 1.840 | 2.1 |
| 2 | 2.34 (325) | 0.21 (12.9) | fast | 0.715 | 0.733 | 0.975 | 4.72 |
| 3 | 2.56 (357) | 0.21 (12.9) | fast | 1.107 | 0.647 | 1.710 | 0.19 |
| 4 | 0.87 (111) | 0.24 (14.9) | fast | 0.706 | 0.996 | 0.709 | 17.56 |
| 5 | 1.00 (131) | 0.24 (14.7) | fast | 0.757 | 0.765 | 0.990 | 3.51 |
| 6 | 0.93 (120) | 0.24 (14.9) | fast | 0.640 | 0.7345 | 0.871 | 5.22 |
| 7 | 0.86 (110) | 0.20 (12.6) | fast | 0.633 | 0.734 | 0.862 | 4.52 |

What is claimed is:

1. A process for finishing a hydrogenated block copolymer of a vinyl aromatic hydrocarbon and a conjugated diene by producing porous pellets from a water slurry of the hydrogenated block copolymer, said process comprising adjusting the water content of the slurry to from 9 to 16 percent by weight, moving the slurry through a mechanical two-stage extruder dryer, drying the slurry at a temperature of 100 to 180° C., and recovering porous copolymer pellets having a moisture content of 0.2 to 3.0 percent by weight.

2. The process of claim 1 wherein the water content of the slurry is from 13 to 15 percent by weight.

3. The process of claim 1 wherein an inert gas is injected into the mechanical dryer during the drying process.

* * * * *